Jan. 2, 1962 R. W. ROCHELLE 3,015,772
SERIES CONNECTED D.C. SUPPLY MAGNETIC AMPLIFIER
Filed June 2, 1959
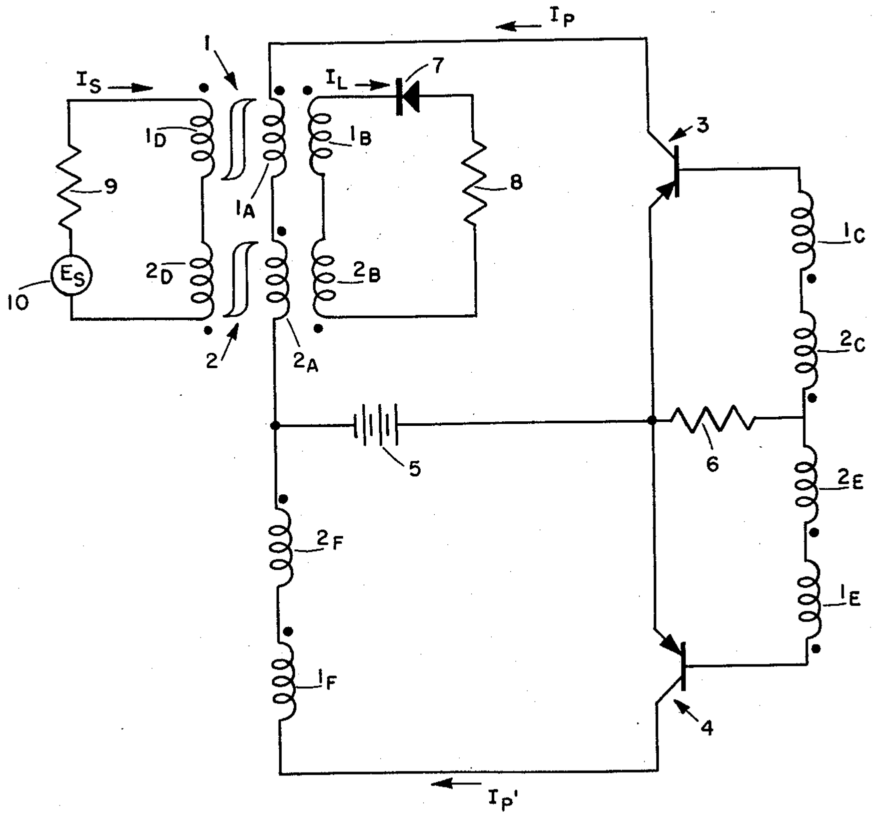
INVENTOR.
Robert W. Rochelle
BY
Louis L. Shrago.

3,015,772
Patented Jan. 2, 1962

3,015,772

SERIES CONNECTED D.C. SUPPLY MAGNETIC AMPLIFIER

Robert W. Rochelle, 943 Swarthmore Drive, Alexandria, Va.

Filed June 2, 1959, Ser. No. 817,690
3 Claims. (Cl. 323—56)
(Granted under Title 35, U.S. Code (1952), sec. 266)

The invention described herein may be manufactured and used by or for the Government of the United States of America for governmental purposes without the payment of any royalties thereon or therefor.

The present invention relates generally to amplifying circuits and more particularly to a high gain magnetic type amplifier capable of amplifying with high efficiency relatively small D.C. or A.C. signals.

In the conventional series opposed magnetic amplifier, a pair of saturable core transformers are excited by series connected primary windings from an alternating current source via a load resistor. Also wound on each core is a control winding, and these windings are connected in series opposition through a control resistor to a signal source. In the absence of a signal at this source, the equal voltages induced into the control windings by the alternating current source cancel out because of their out-of-phase relationship and, consequently, there is no interaction between these circuits. However, when a signal voltage appears, it produces opposite effects in the cores so that one core is advanced towards saturation and the other retarded, and this difference in magnetization level gives rise to a quiescent current in the load circuit. The magnitude of this signal is negligible as long as both cores are unsaturated, but as soon as one core saturates, this current increases to a value approximately equal to the control current times the ratio of secondary turns to primary turns of the transformer.

In the A.C. operation of these amplifiers, it is necessary, from a standpoint of efficiency, that the frequency and phase of the alternating current and the signal source match. If this relationship is not established, the control signal will not be switched to the load for a maximum part of each cycle. Also, both cores will be saturated for some interval of time and an increased power loss will occur in the system. In other words, since the A.C. current effectively determines the length of time each core stays saturated, the frequency of this current should match that of the control signal for best performance. Furthermore, any frequency of phase dissimilarity between these signals produces a "dead time" between cycles, during which time both cores are unsaturated and the amplifier consequently unresponsive to the control signal.

Also in prior art systems of this general configuration, the output current lags the A.C. voltage by an angle dependent upon the magnitude of the alternating current voltage and the signal source when the latter signal is in the form of a constant D.C. voltage. This lag can be eliminated by utilizing a rectified A.C. voltage for the above constant D.C. voltage and by having the frequency and phase of this rectified voltage the same as that of the A.C. source. The requirement of a rectifier in the control circuit dictated by this mode of operation, however, prevents the system from functioning with extremely small input signals.

It is accordingly a primary object of the present invention to provide a high gain magnetic amplifier capable of efficient operation with relatively small D.C. or A.C. input signals.

Another object of the present invention is to provide an improved magnetic amplifier which does not require an A.C. signal source for its operation.

A further object of the present invention is to provide a new and improved magnetic type amplifier which develops its own A.C. control signal, the frequency of which automatically conforms to that of the A.C. input signal.

A still further object of the present invention is to provide a magnetic amplifier which is energized from a multivibrator which utilizes the saturable cores of the magnetic amplifier.

Another object of the present invention is to provide an efficient magnetic amplifier which can operate from a D.C. voltage source.

A still further object of the present invention is to provide a series opposed magnetic amplifier wherein the control signal is switched to the load circuit for a maximum part of each cycle.

A still further object of the present invention is to provide a series opposed magnetic amplifier which has no so-called "dead time."

A still further object of the present invention is to provide a series opposed magnetic amplifier which develops its own A.C. energizing signal from an automatically controlled multivibrator whose period adjusts to that of the input signal.

Other objects and many of the attendant advantages of this invention will be readily appreciated as the same becomes better understood by reference to the following detailed description when considered in connection with the accompanying drawing, the sole FIGURE of which is a schematic diagram of a preferred embodiment of the invention.

Briefly and in general terms, the above objects of invention are realized by utilizing a pair of saturable cores as the control elements in both a magnetic amplifier and a multivibrator circuit. A pair of transistors provide the switching action to alternately magnetize the cores in opposite directions. As soon as both cores reach saturation, the transistors automatically carry out the above switching operation and, hence, there is no "dead time" or power loss in the system.

Referring to the schematic drawing, a pair of saturable core transformers, generally represented by reference characters 1 and 2, each have a multiplicity of mutually coupled windings *1a*, *1b*, *1c*, *1d*, *1e*, *1f* and *2a*, *2b*, *2c*, *2d*, *2e*, *2f*, the polarity relationship of each one of these windings being indicated by the dot appearing adjacent thereto. Windings *1a* and *2a*, one pair of primaries, are connected in series with a D.C. voltage source 5 and pnp transistor 3; windings *1f* and *2f*, another pair of primaries, are connected in series with source 5 and a pnp transistor 4; windings *1c* and *2c*, one pair of feedback windings, are connected in series with a current limiting resistor 6 between the emitter and base of transistor 3; windings *1e* and *2e*, another pair of feedback windings, are connected in series with current limiting resistor 6 between the emitter and base of transistor 4; windings *1d* and *2d*, the control windings, are connected in series through control resistor 9 to the control signal source 10; and lastly, winding *1b* and *2b*, the output or secondary windings, are connected in series with rectifier 7 across load resistor 8.

If the input signal circuit and the output circuit are both disregarded for the time, it will be seen that what remains constitutes a free-running multivibrator, the operation of which is as follows: Initially, D.C. voltage source 5 biases transistors 3 and 4 in a forward direction with each collector negative with respect to each emitter and the bases at the same potential as the emitters. Thus, currents $I_p$ and $I_p'$ tend to flow from source 5 via transistors 3 and 4 to primary windings *1a* and *2a* and 1*f* and 2*f*, respectively. In the transient state, these currents are not identical, of course, so that it may be assumed for purposes of description that current $I_p$ has the greater instantaneous magnitude and that voltages appear across windings 1*c* and 2*c* and 1*e* and 2*e*. However, only the former voltage has the correct polarity to drive the base of one transistor, that is transistor 3, negative with respect to its emitter. In other words, while equal voltages are induced across the above pairs of windings because of the current $I_p$, these voltages have opposite polarities so that the emitter-to-collector impedance of transistor 3 decreases while that of transistor 4 increases. This action is of a regenerative nature because of the couplings between the primaries and the feedback windings, and transistor 4 is immediately blocked so that the only current path from D.C. source 5 is via transistor 3 to windings 1*a* and 2*a*.

Since it has been assumed that there is no signal source 10 acting on the system, the cores of transformers 1 and 2 both move towards, for example, positive saturation at the same rate. After the lapse of a predetermined time depending upon the "volt-seconds capacity" of the cores, saturation occurs and the voltages across windings 1*c* and 2*c* and 1*e* and 2*e* rapidly fall off towards zero for reasons well known. This removal of the forward bias voltage on transistor 3 and the blocking bias on transistor 4 causes the impedance of these transistors to increase and decrease respectively. Subsequently, a condition is reached whereat current from source 5 can flow via transistor 4 to windings 1*f* and 2*f* and the feedback windings now function to block transistor 3 and completely unblock transistor 4. With the latter windings excited, the voltages induced in the feedback windings 1*c* and 2*c* and 1*e* and 2*e* hold the transistors in the above condition until both cores next become saturated. As soon as this occurs, the transistors are once again switched and a new cycle starts.

It will thus be seen that whenever one set of primary windings, for example, 1*a* and 2*a*, drives both cores to saturation in a first direction the state of conduction of the transistors is immediately reversed so that the other set of primary windings 1*f* and 2*f* can then drive the cores to saturation in an opposite direction.

It will be recalled from what has been said before that in conventional series opposed magnetic amplifiers the control windings are connected in series opposition so that the voltages induced in these windings by the A.C. signal cancels out. In the present arrangement, both the control windings 1*d* and 2*d* and the secondary windings 1*b* and 2*b* are so phased to achieve the same result.

When a D.C. signal, for example, appears at source 10, having a polarity such as to cause a current $I_S$ to flow through windings 1*d* and 2*d*, the flux thus produced adds to that produced by $I_P$ flowing through winding 1*a* and subtracts from that produced by the same current flowing through winding 2*a*. This is, of course, due to the opposite polarity relationship existing between windings 2*a* and 2*d*. Thus, $I_S$ biases the core of transformer 1 towards saturation and the core of transformer 2 away from saturation. Due to the different magnetization levels of these cores, unequal voltages are induced in windings 1*b* and 2*b*, with the latter voltage in the present case of greater value. However, no current can flow in the load circuit at this time because of the blocking action of rectifier 7. It would be pointed out that as long as the cores of both transformers are unsaturated, this current would otherwise have a negligible value.

As a result of the unequal magnetization levels above described, current $I_P$ drives the core of transformer 1 to saturation first. When this happens, all the voltage of source 5 divides between transistor 3 and winding 2*a* and an increased output voltage appears across winding 2*b*. However, as explained above, no load current can flow during this part of the cycle because of the continued blocking action of rectifier 7. The core of transformer 2 subsequently reaches saturation and, as soon as this happens, transistor 3 is automatically switched to a blocked condition for the reasons described hereinbefore. Simultaneously, transistor 4 is rendered conducting and current $I_P'$ excites windings 1*f* and 2*f* and commences to drive the cores to saturation in a direction opposite to that previously attained. In this case, current $I_S$ produces fluxes which will detract and add to those produced by windings 1*f* and 2*f*, respectively. Thus, the core of transformer 2 reaches saturation before that of transformer 1. When this occurs, an output voltage appears across winding 1*b*. In this case, the polarity of this output voltage is compatible with the connections of rectifier 7, and during this part of the cycle, load current flows through output resistor 8. When the transformer of core 1 subsequently saturates, the above cycle is repeated. It will thus be seen that a pulsing current is developed in the output circuit whose average value is an amplified version of $I_S$.

The power gain of the above system can be calculated as follows. If $t_1$ is the total time load current is drawn, $t_s$ the total time neither core is saturated, $E_s$ the signal voltage, $E_b$ the battery voltage, $N_2$ the turns ratio of the load winding to the primary winding, $R_2$ the load resistance, and $R_s$ the resistance of the signal circuit, then neglecting the fact that the signal source is also required to furnish the differential magnetizing current due to eddy current losses in the core, the power gain may be expressed as $$G=\frac{P_o}{P_{in}}=\frac{\left(\frac{(N_2E_b)^2}{R_2}\right)\left(\frac{t_1}{t_1+t_s}\right)}{\frac{E_s^2}{R_s}} \tag{1}$$

But:

$$\frac{E_s}{2N_3}t_s=E_bt_1 \tag{2}$$

where $N_3$=turns ratio of signal winding to primary, since the volt seconds required for saturation of a saturable core is a constant, then:

$$t_1=\frac{E_st_s}{2N_3E_b} \tag{3}$$

Substituting:

(4)

$$\frac{P_o}{P_{in}}=\left(\frac{N_2E_b}{E_s}\right)^2\frac{R_s}{R_2}\frac{\left(\frac{E_s}{2N_3E_b}\right)t_s}{\left(\frac{E_3}{2N_3E_b}\right)t_s+t_s}=\frac{N_2^2}{2N_3}\frac{R_s}{R_2}\frac{E_b}{E_3}\frac{1}{1+\frac{E_s}{2N_3E_b}}$$

For small signal operation:

$$\frac{P_o}{P_{in}}=\frac{N_2^2}{2N_3}\frac{R_s}{R_2}\frac{E_b}{E_s} \tag{5}$$

When the signal voltage has an A.C. characteristic, it will be recognized that during that half of its cycle, for example, when current $I_S$ flows in the direction of the arrow shown and $I_P$ flows through the primary windings, the core of transformer 1 saturates first and the output voltage appears across secondary winding 2*b*. Later, when the core of transformer 2 saturates, the transistors switch so that in the following half cycle when $I_S$ flows in the opposite direction and current $I_{P'}$ flows through the primaries 1*f* and 2*f*, the core of transformer 1 again saturates first but in a direction opposite to that previously attained. This, of course, is due to the direction in which current $I_{P'}$ flows through primary winding 1*f*. The output voltage again appears across secondary winding 2*b*, but this time its polarity is changed since $I_{P'}$ flows through primary 2*f* in a direction opposite to that in which $I_P$ previously excited primary winding 2*a*. When both cores are saturated in this new direction, the transistors automatically switch to start a new cycle. It will be obvious that rectifier 7 must be removed from the output circuit when an A.C. signal is acting in the control circuit.

In connection with the A.C. mode of operation, it would be pointed out that where it is desired to realize a power gain the A.C. signal should be biased so that it is effectively a unidirectional signal. In this instance, the rectifier, of course, will remain in the secondary circuit. Where the A.C. signal is not biased, there is no power gain but merely a voltage gain and, as mentioned hereinbefore, the rectifier must be eliminated.

It will be appreciated from the foregoing analysis that the frequency of the multivibrator circuit automatically adjusts to that of the A.C. signal since the transistors change their conduction status as soon as both cores are saturated. This insures maximum signal transfer to the output circuit and also eliminates any wasted power which would otherwise occur if both cores stay in a saturated condition for any length of time.

It will also be appreciated that it is desirable to increase the base drive of the conducting transistor, that is, the negative level of the base with respect to the emitter to lower its impedance during that period of the cycle in which load current is flowing. This mode of operation can be accomplished simply by supplying the bases from bucking instead of aiding feedback windings which have unequal turns. For example, in one embodiment of the invention, feedback winding 1*c* developed before saturation one volt while winding 2*c* developed a half a volt. Consequently, the base of the conducting transistor was a half a volt negative with respect to the emitter. When the core of transformer 2 saturated, the bucking voltage disappeared, the voltage of the battery divided between primary winding 1*a* and transistor 3, and the base voltage doubled. Thus, the base drive was increased by a factor of four.

Obviously many modifications and variations of the present invention are possible in the light of the above teachings. It is therefore to be understood that within the scope of the appended claims the invention may be practiced otherwise than as specifically described.

What is claimed is:

1. A magnetic amplifier comprising, in combination, first and second saturable core transformers, each transformer having at least a control winding, exciting windings and an output winding, means for connecting said control windings in series opposition and said output windings in series opposition, a unidirectional signal coupled to said control windings and biasing the cores of said transformers to different levels of magnetization, a load resistor and a rectifier across the series combination of said output windings, a free-running multivibrator circuit, said multivibrator circuit having a signal feedback path which includes said exciting windings whereby said multivibrator is triggered from one stable state to another whenever the cores of said transformers are both at saturation insuring synchronous operation between the multivibrator circuit and said unidirectional signal so that the frequency and phase of the multivibrator circuit can automatically adjust to that of said unidirectional signal, said multivibrator driving the cores of said transformers to saturation in opposite directions during successive half cycles thereof.

2. A magnetic amplifier comprising, in combination, first and second saturable core transformers, each transformer having at least a control winding and an output winding, means for connecting said control windings in series opposition, a unidirectional signal coupled to the series combination of said control windings whereby the cores of said transformers are initially biased to different levels of magnetization, means for connecting said output windings in series opposition, a load resistor and a rectifier in series across the series combination of said output windings, a multivibrator, said multivibrator driving the cores of said first and second transformers to saturation in a first direction during one-half of its cycle and in an opposite direction during the other half of the cycle, said multivibrator being triggered from one stable state to the other whenever the cores of said first and second transformers are both saturated insuring synchronous operation between the multivibrator circuit and said unidirectional signal so that the frequency and phase of the multibrator circuit can automatically adjust to that of said unidirectional signal.

3. A magnetic amplifier comprising, in combination, first and second saturable core transformers, each of said transformers having a first and second exciting winding, a first and second feedback winding, a control winding and an output winding, first and second transistors, each of said transistors having an emitter, base and collector electrode, said emitters being interconnected, a source of D.C. potential, the positive terminal of said source being connected to said emitters, means for connecting said first exciting windings in series between the collector of said first transistor and the negative terminal of said voltage source, means for connecting said second exciting windings in series between the collector of said second transistor and said negative terminal, a resistor, one side of said resistor being connected to said emitters, means for connecting said first feedback windings in series between the base of said first transistor and the other side of said resistor, means for connecting said second feedback windings in series between the base of said second transistor and said other side of said resistor, the series combination of said first feedback windings driving the base of said first transistor in a first direction with respect to its emitter and the series combination of said second feedback windings driving the base of said second transistor with respect to its emitter in an opposite direction in response to energization of said first or second exciting windings whereby a free-running multivibrator circuit is formed, means for connecting the control windings of said first and second transformers in series opposition, a signal source coupled to the series combination of said control windings, means for connecting the output windings of said first and second transformers in series opposition, and a load resistor connected across the series combination of said output windings.

References Cited in the file of this patent

UNITED STATES PATENTS

| | | |
|---|---|---|
| 2,777,073 | Fingerett et al. | Jan. 8, 1957 |
| 2,794,165 | Van Scoyor | May 28, 1957 |
| 2,826,731 | Paynter | Mar. 11, 1958 |
| 2,831,929 | Rossi et al. | Apr. 22, 1958 |
| 2,848,614 | Lyons | Aug. 19, 1958 |
| 2,854,850 | Urchin et al. | Sept. 30, 1958 |
| 2,897,433 | Putkovich et al. | July 28, 1959 |
| 2,964,716 | Berman | Dec. 13, 1960 |

FOREIGN PATENTS

| | | |
|---|---|---|
| 769,186 | Great Britain | Feb. 27, 1957 |